(12) United States Patent
Osby et al.

(10) Patent No.: US 11,084,893 B2
(45) Date of Patent: Aug. 10, 2021

(54) ETHYLENE-BASED POLYMERS AND PROCESSES FOR THE SAME

(71) Applicant: Dow Global Technologies LLC, Midland, MI (US)

(72) Inventors: John O. Osby, Lake Jackson, TX (US); Mehmet Demirors, Pearland, TX (US); Ivan A. Konstantinov, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 80 days.

(21) Appl. No.: 16/617,128

(22) PCT Filed: Jun. 1, 2018

(86) PCT No.: PCT/US2018/035675
§ 371 (c)(1),
(2) Date: Nov. 26, 2019

(87) PCT Pub. No.: WO2018/223045
PCT Pub. Date: Dec. 6, 2018

(65) Prior Publication Data
US 2020/0148799 A1 May 14, 2020

Related U.S. Application Data

(60) Provisional application No. 62/514,071, filed on Jun. 2, 2017.

(51) Int. Cl.
*C08F 10/02* (2006.01)
*C08F 210/18* (2006.01)
*C08F 210/02* (2006.01)
*C08L 101/00* (2006.01)

(52) U.S. Cl.
CPC .......... *C08F 210/02* (2013.01); *C08F 210/18* (2013.01); *C08L 101/00* (2013.01)

(58) Field of Classification Search
CPC ............................ C08F 210/02; C08F 220/40
See application file for complete search history.

(56) References Cited

U.S. PATENT DOCUMENTS

| | | |
|---|---|---|
| 3,542,749 A | 11/1970 | Anspon |
| 5,539,075 A | 7/1996 | Gustafsson et al. |
| 5,656,692 A * | 8/1997 | Hayes ........................ C08F 8/14 525/330.6 |
| 5,763,629 A | 6/1998 | Fan et al. |
| 5,844,045 A | 12/1998 | Kolthammer et al. |
| 5,869,575 A | 2/1999 | Kolthammer et al. |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 2008/0242809 A1 | 10/2008 | Neuteboom et al. |
| 2009/0253878 A1 | 10/2009 | Ye et al. |
| 2012/0252990 A1 | 10/2012 | Berbee et al. |
| 2013/0237678 A1 | 9/2013 | Osby et al. |
| 2014/0288257 A1 | 9/2014 | Zschoch et al. |
| 2014/0316094 A1 | 10/2014 | Berbee et al. |
| 2014/0316096 A1 | 10/2014 | Berbee et al. |
| 2015/0197590 A1 | 7/2015 | Osby |
| 2016/0102155 A1 | 4/2016 | Berbee et al. |
| 2016/0304643 A1 | 10/2016 | Eddy et al. |

FOREIGN PATENT DOCUMENTS

| | | |
|---|---|---|
| GB | 2294044 A | 4/1996 |
| WO | 9745465 A1 | 12/1997 |
| WO | 0168723 A2 | 9/2001 |
| WO | 0214379 A1 | 2/2002 |
| WO | 2007110127 A1 | 10/2007 |
| WO | 2012057975 A1 | 5/2012 |
| WO | 2012084787 A1 | 6/2012 |
| WO | 2013059042 A1 | 4/2013 |
| WO | 2013095969 A1 | 6/2013 |
| WO | 2013078018 A3 | 8/2013 |
| WO | 2014003837 A1 | 1/2014 |
| WO | 2015100302 A1 | 7/2015 |
| WO | 2015100318 A1 | 7/2015 |
| WO | 2015200426 A1 | 12/2015 |
| WO | 2016209381 A1 | 12/2016 |
| WO | 2016210075 A1 | 12/2016 |
| WO | 2016210160 A1 | 12/2016 |
| WO | 2016210308 A1 | 12/2016 |

OTHER PUBLICATIONS

International Search Report and Written Opinion pertaining to PCT/US2018/03565, dated Aug. 17, 2018.
Liu et al., "Branched Polymer via Free Radical Polymerization of Chain Transfer Monomer: A Theoretical and Experimental Investigation", J. Polym. Sci. Part A: Polym. Chem., 2007, 46, 1449-59.
Becke, Axel D. "Density-Functional Thermochemistry. III. The Role of Exact Exchange", J Chem Phys, 1993, 98, 5648.
Lee et al., "Development of the Colle-Salvetti Correlation-Energy Formula into a Functional of the Electron Density", Phys Rev B, 1988, 37, 785.
Frisch et al., "Self-Consistent Molecular Orbital Methods 25. Supplementary Functions for Gaussian Basis Sets", J Chem Phys, 1984, 80, 3265.
Hehre et al., "Self-Consistent Molecular Orbital Methods. XII. Further Extension of Gaussian-Type Basis Sets for Use in Molecular Orbital Studies of Organic Molecular", J Chem Phys, 1972, 56, 2257.
Gonzalez et al., "Reaction Path Following in Mass-Weighted Internal Coordinates", J Phys Chem, 1990, 94, 5523.
Zhao et al, "The M06 suite of density functionals for main group thermochemistry, thermochemical kinetics, noncovalent interactions, excited states, and transition elements: two new functionals and systematic testing of four M06-class functionals and 12 other functionals", Theor Chem Acc, 2008, 120, 215.

(Continued)

*Primary Examiner* — Jeffrey C Mullis
(74) *Attorney, Agent, or Firm* — Dinsmore & Shohl LLP

(57) ABSTRACT

An ethylene-based polymer formed from reacting at least the following: ethylene and at least one asymmetrical polyene, and wherein the reaction takes place in the presence of at least one free-radical initiator; and wherein the at least one asymmetrical polyene is selected from Structure A, as described herein; Structure B, as described herein; or a combination of Structure A and Structure B.

11 Claims, 1 Drawing Sheet

(56) References Cited

OTHER PUBLICATIONS

Simon et al., "How does basis set superposition error change the potential surfaces for hydrogen-bonded dimers?", J. Chem. Phys., 1996, 105, 11024.

McQuarrie, D. Statistical Mechanics; University Science Books: Sausalito, CA, 2000. (uploaded in four parts).

Tung et al., Preparation of Polystyrene with Long Chain Branches via Free Radical Polymerization, J. Polym. Sci., Polym. Chem. Ed., 1981, 19, 2027-39.

Tung, L.H., "Branching Kinetics in Copolymerization of Styrene with a Chain-Transfer Monomer", J. Polym. Sci., Polym. Chem. Ed., 1981, 19, 3209-3217.

Boys et al., "The Calculation of Small Molecular Interactions by the Differences of Separate Total Energies. Some Procedures with Reduced Errors", Molecular Physics, 1970, 553-566.

Hariharan et al., "The influence of polarization functions on molecular orbital hydrogenation energies", Theoret. Chim. Acta, 1973, 28, 213-222, https://doi.org/10.1007/BF00533485 (Abstract Only).

* cited by examiner

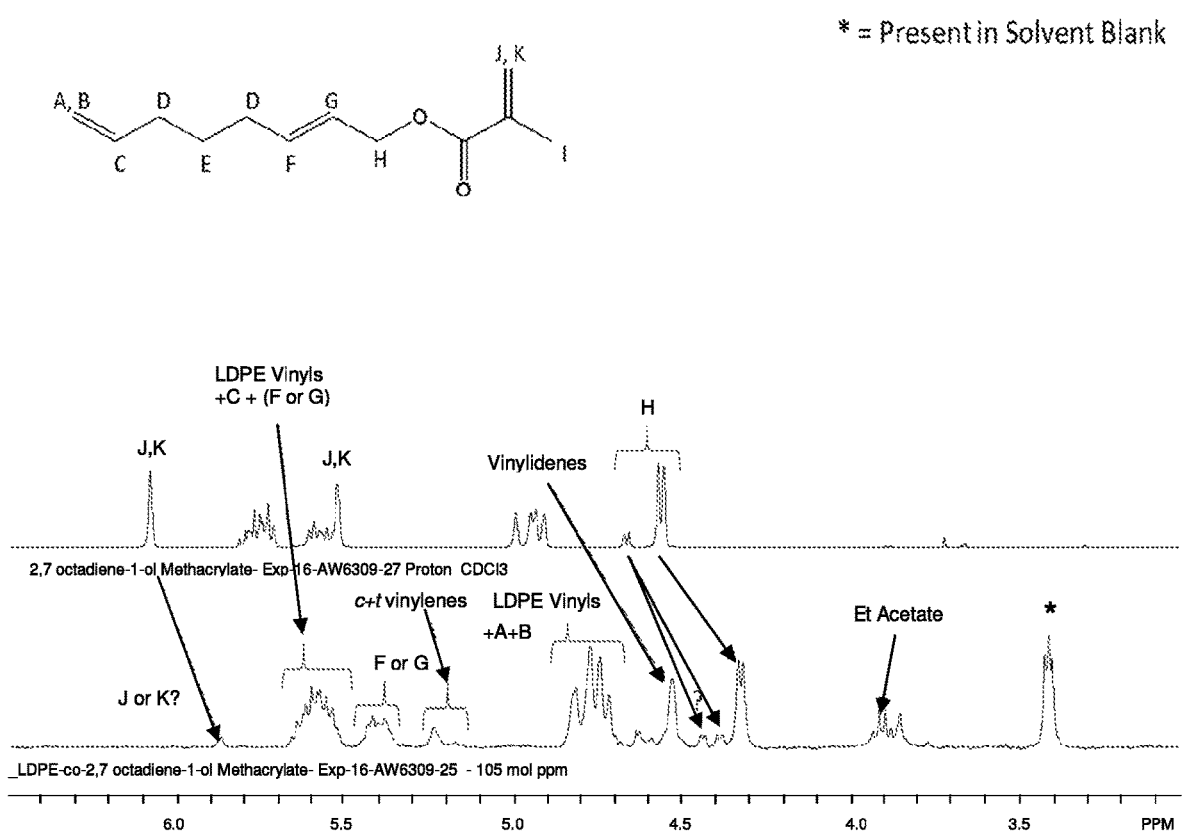

ETHYLENE-BASED POLYMERS AND PROCESSES FOR THE SAME

CROSS REFERENCE TO RELATED APPLICATION

This application is a National Stage Entry under 35 U.S.C. § 371 of International Patent Application No. PCT/US2018/035675, filed Jun. 1, 2018, which claims the benefit of U.S. Provisional Application 62/514,071, filed on Jun. 2, 2017.

BACKGROUND

Low density polyethylene is made by two reactor technologies, autoclave and tubular. Autoclave reactors produce higher melt strength LDPE, at a given melt index, than tubular reactors, however autoclave reactors are more costly to build and maintain than tubular reactors. There is a need for ethylene-based polymers that have "autoclave-like melt strength" but polymerized on tubular reactors.

The following references disclose the use of chemical modifiers, used in free-radical polymerizations of ethylene to alter polymer rheology. European Patent Application EP 2655444A1 discloses, "copolymerizing ethylene, a bi- or multifunctional comonomer and optionally further comonomers, wherein the bi- or multifunctional comonomer having at least two different functional groups. U.S. Publication No. 2015/0197590 discloses the use of at least one asymmetrical polyene, comprising an "alpha, beta unsaturated end" and a "C—C double bond end. See also U.S. Publication No. 2016/0304643. U.S. Publication No. 2008/0242809 discloses the use of a di- or higher functional (meth)acrylate. International Publication No. WO 2007/110127 discloses the use of a bifunctional αω-alkadiene. U.S. Pat. No. 5,539,075 discloses the use of a polyunsaturated comonomer such as an α,ω-alkadiene. International Publication No. WO 97/45465 discloses the use of a diunsaturated comonomer of the formula (I): H2C=CH—O—R—CH=CH2, wherein R=—(CH2)m-O—, —(CH2CH2O)n-, or —CH2-C6H1O-CH2-O—, m=2-10, and n=1-5.

Tung, L. H., et al., *Preparation of Polystyrene with Long Chain Branches via Free Radical Polymerization*, J. Polym. Sci., Polym. Chem. Ed., (1981), 19, 2027-39, discloses the use of small amounts of chain-transferring monomers, for example, vinylbenzylthiol, to copolymerize with styrene, free-radically. Tung, L. H., *Branching Kinetics in Copolymerization of Styrene with a Chain-Transfer Monomer*, J. Polym. Sci., Polym. Chem. Ed., (1981), 19, 3209-3217, discloses the use of polymerization kinetics to compute the theoretical molecular weight and degree of branching, for the polymerization with styrene with a chain transfer monomer (for example, vinylbenzylthiol). Liu, J., et al., *Branched Polymer via Free Radical Polymerization of Chain Transfer Monomer: A Theoretical and Experimental Investigation*, J. Polym. Sci. Part A: Polym. Chem., (2007), 46, 1449-59, discloses a mathematical model for the free radical polymerization of chain transfer monomers, containing both polymerizable vinyl groups and telogen groups. The molecular architecture of the polymer is disclosed as being prognosticated according to the developed model, which was validated experimentally by the homopolymerization of 4-vinyl benzyl thiol (VBT), and its copolymerization with styrene.

U.S. Pat. No. 3,542,749 discloses ethylene copolymers that contain polymerized ethylene and polymerized oleyl acrylate, erucyl acrylate, N-oleyl acrylamide, nerucyl acrylamide or any mixture thereof. U.S. Patent Publication 2009/0253878 discloses a polyolefin polymer comprising one or more terminal polymerizable methacryloyl groups, and a process for preparing the same. U.S. Pat. No. 5,763,629 discloses a process to prepare alkoxylated glycidyl (meth)acrylates. See also WO 2012/084787, WO 2012/057975, WO 2013/095969, WO 2015/100302, WO 2015/100318, WO 2015/200426, WO 2016/210075, WO 2016/210160, WO 2016/209381, WO 2016/210308.

However, as discussed, there remains a need for ethylene-based polymers that have "autoclave-like melt strength" but polymerized on tubular reactors. This need has been met by the following as discussed below.

SUMMARY OF THE INVENTION

An ethylene-based polymer formed from reacting at least the following: ethylene and at least one asymmetrical polyene, and wherein the reaction takes place in the presence of at least one free-radical initiator; and wherein the at least one asymmetrical polyene is selected from the following:

A)

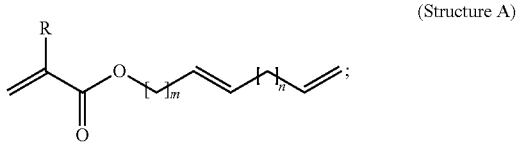

(Structure A)

wherein R=H or C1-C6 alkyl, m=1 to 12, n=1 to 10;

B)

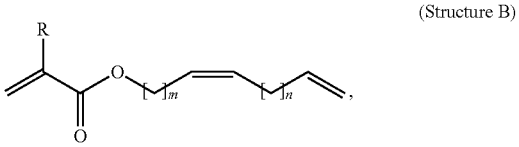

(Structure B)

wherein R=H or C1-C6 alkyl, m=1 to 12, n=1 to 10; or

C) a combination of Structure A and Structure B.

BRIEF DESCRIPTION OF THE DRAWINGS

FIG. 1 shows the 1H NMR profile of an inventive ethylene-based polymer.

DETAILED DESCRIPTION

As discussed above, the following is provided: an ethylene-based polymer formed from reacting at least the following: ethylene and at least one asymmetrical polyene, and wherein the reaction takes place in the presence of at least one free-radical initiator; and wherein the at least one asymmetrical polyene is selected from the following:

A)

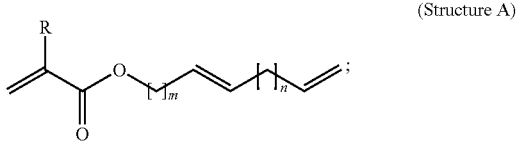

(Structure A)

wherein R=H or C1-C6 alkyl, m=1 to 12, n=1 to 10;

B)

(Structure B)

[Structure B: CH2=C(R)-C(=O)-O-(CH2)m-CH=CH-(CH2)n-CH=CH2]

wherein R=H or C1-C6 alkyl, m=1 to 12, n=1 to 10; or

C) a combination of Structure A and Structure B.

The ethylene-based polymer may comprise a combination of two or more embodiments as described herein.

Structure A may comprise a combination of two or more embodiments as described herein.

Structure B may comprise a combination of two or more embodiments as described herein.

In one embodiment, for Structure A, R=H or C1-C3 alkyl, and for Structure B, R=H or C1-C3 alkyl.

In one embodiment, for Structure A, R=C1-C3 alkyl, and for Structure B, R=C1-C3 alkyl.

In one embodiment, for Structure A, m=1-3 and n=1-3, and for Structure B, m=1-3 and n=1-3.

In one embodiment, for Structure A, m=1-2 and n=1-3, and for Structure B, m=1-2 and n=1-3.

In one embodiment, for Structure A, m=1 and n=1-3, and for Structure B, m=1 and n=1-3.

In one embodiment, for Structure A, m=1 and n=3, and for Structure B, m=1 and n=3.

In one embodiment, for Structure A, m=1 and n=2, and for Structure B, m=1 and n=2.

In one embodiment, for Structure A, m=1 and n=1, and for Structure B, m=1 and n=1.

In one embodiment, for Structure A, m=1-3 and n=1-2, and for Structure B, m=1-3 and n=1-2.

In one embodiment, for Structure A, m=1-3 and n=1, and for Structure B, m=1-3 and n=1.

In one embodiment, the at least one asymmetrical polyene is selected from Structure A.

In one embodiment, the at least one asymmetrical polyene is selected from Structure B.

In one embodiment, the at least one asymmetrical polyene is selected from Structure A1:

(Structure A1)

[Structure A1: CH2=C(CH3)-C(=O)-O-CH2-CH=CH-CH2-CH2-CH=CH2]

In one embodiment, the at least one asymmetrical polyene is selected from Structure B.

In one embodiment, in the reaction, the at least one asymmetrical polyene is present in an amount ≥100 ppm, or ≥150 ppm, or ≥200 ppm, based on the total amount of ethylene.

In one embodiment, in the reaction, the at least one asymmetrical polyene is present in an amount ≤10,000 ppm, or ≤8,000 ppm, or ≤6,000 ppm, or ≤4,000 ppm, or ≤2,000 ppm, or ≤1,000 ppm based on the total amount of ethylene.

In one embodiment, the ethylene-based polymer comprises, in polymerized form, ethylene and the polyene, as the only monomeric structures.

In one embodiment, the ethylene-based polymer is a LDPE modified with the polyene. In a further embodiment, the ethylene-based polymer comprises, in polymerized form, ethylene and the polyene, as the only monomeric structures.

In one embodiment, ethylene-based polymer comprises at least one structure selected from the group consisting of Structure I, Structure II, or both Structure I and Structure II, as shown below:

Structure I)

wherein R1 is selected from H or C1-C6 alkyl, or from H or C1-C3 alkyl, or R1 is H;

Structure II)

wherein R1 is selected from H or C1-C6 alkyl, or from H or C1-C3 alkyl, or R1 is H.

In the structures I and II above, the notation " ||||||||||| " represents a break at the center of a covalent carbon-carbon bond in the hydrocarbon backbone of the ethylene-based polymer.

In one embodiment, the polymer comprises at least one structure selected from Structure I. In a further embodiment, the polymer comprises at least two structures selected from Structure I.

In one embodiment, the polymer comprises at least one structure selected from Structure II. In a further embodiment, the polymer comprises at least two structures selected from Structure II.

In one embodiment, the asymmetrical polyene is present in an amount greater than, or equal to, 100 ppm, based on the total amount of ethylene in the reactor.

In one embodiment, the ethylene-based polymer is polymerized in the presence of at least two asymmetrical polyenes, and further two asymmetrical dienes, as disclosed herein.

An asymmetrical polyene may comprise a combination of two or more embodiments as described herein.

In one embodiment, the ethylene-based polymer comprises at least one incorporated structure derived from Structure A or Structure B, as shown above.

In one embodiment, the ethylene-based polymer comprises at least one incorporated structure derived from Structure A, as shown above.

In one embodiment, the ethylene-based polymer comprises at least one incorporated structure derived from Structure B, as shown above.

In one embodiment, the ethylene-based polymer comprises at least one incorporated structure derived from Structure A1, as shown above.

In one embodiment, the ethylene-based polymer comprises at least two incorporated structures derived from Structure A1, as shown above.

In one embodiment, the ethylene-based polymer comprises at least one incorporated structure derived from Structure A, as shown above, and at least one incorporated structure derived from Structure B, as shown above.

In one embodiment, the ethylene-based polymer comprises, in reacted form, greater than, or equal to, 0.015 moles of the asymmetrical polyene per 1000 moles of ethylene-based polymer backbone carbons, based on the weight of the polymer. In one embodiment, the ethylene-based polymer comprises, in reacted form, less than, or equal to, 10 moles asymmetrical polyene per 1000 moles of ethylene-based polymer back bone carbons, based on the weight of the polymer. In one embodiment, the ethylene-based polymer comprises, in reacted form, less than, or equal to, 5 moles asymmetrical polyene per 1000 moles of ethylene-based polymer back bone carbons, based on the weight of the polymer.

In one embodiment, the ethylene-based polymer comprises, in reacted form, at least 0.03 weight percent of the asymmetrical polyene, based on the weight of the polymer. In one embodiment, the ethylene-based polymer has a melt index ($I_2$) from 0.3 to 100 g/10 min, or from 0.5 to 50 g/10 min, or from 1 to 20 g/10 min.

In one embodiment the ethylene-based polymer has a density greater than, or equal to, 0.900, or greater than, or equal to, 0.905, or greater than, or equal to, 0.910, grams per cubic centimeter (g/cc or g/cm$^3$). In one embodiment the ethylene-based polymer has a density less than, or equal to, 0.950, or less than, or equal to, 0.945, or less than, or equal to, 0.940, grams per cubic centimeter (g/cc or g/cm$^3$). In one embodiment the ethylene-based polymer has a density from 0.900 to 0.950 g/cc, or from 0.905 to 0.945 g/cc, or from 0.910 to 0.940, g/cc.

In one embodiment, the ethylene-based polymer is a modified low density polyethylene, comprising, in polymerized form, ethylene, and bonded chemical groups derived from the asymmetrical polyene. In a further embodiment, the modified LDPE comprises less than 2.0 wt %, further less than 1.0 wt %, of other comonomer(s), based on the weight of the modified LDPE. In a further embodiment, the ethylene-based polymer comprises, in polymerized form, ethylene and the polyene, as the only monomeric structures.

In one embodiment, the ethylene-based polymer comprises, in reacted form, greater than or equal to 0.015 moles of the asymmetrical polyene per 1000 moles of carbon atoms incorporated into the polymer, or, in other words, per 500 moles of ethylene units incorporated into the polymer. In a further embodiment, the ethylene-based polymer comprises, in polymerized form, ethylene and the polyene, as the only monomeric structures.

In one embodiment, the ethylene-based polymer comprises, in reacted form, less than or equal to 10 moles, or less than or equal to 5 moles, or less than or equal to 2 moles, or less than or equal to 1 mole of asymmetrical polyene per 1000 moles of carbon atoms incorporated into the polymer, or, in other words, per 500 moles of ethylene units incorporated into the polymer. In a further embodiment, the ethylene-based polymer comprises, in polymerized form, ethylene and the polyene, as the only monomeric structures.

In one embodiment, the ethylene-based polymer comprises, in reacted form, at least 0.03 weight percent of the asymmetrical polyene, based on the weight of the polymer. In a further embodiment, the asymmetrical polyene is an asymmetrical diene. In a further embodiment, the ethylene-based polymer comprises, in polymerized form, ethylene and the polyene, as the only monomeric structures.

Also provided is a composition comprising an inventive ethylene-based polymer as described herein. In a further embodiment, the composition comprises at least one other polymer. In a further embodiment, the other polymer differs in one or more of the following features from the ethylene-based polymer; density, I2, ethylene content, Mw, Mn, MWD, and/or Tm.

In one embodiment, the composition further comprises another ethylene-based polymer that differs from the inventive ethylene-based polymer in one or more properties, for example, density, melt index (I2), Mw, Mn or Mw/Mn.

In one embodiment, the composition further comprises an ethylene/α-olefin interpolymer with a density less than, or equal to, 0.94 g/cc. In one embodiment, the composition further comprises an ethylene/α-olefin interpolymer with a density greater than, or equal to, 0.90 g/cc, or greater than, or equal to, 0.91 g/cc.

Also is provided an article comprising at least one component formed from an inventive composition as described herein.

In one embodiment, the article is a film or a coating.

In one embodiment, the article is a film.

In one embodiment, the article is a coating.

An inventive ethylene-based polymer may comprise a combination of two or more embodiments as described herein.

An inventive composition may comprise a combination of two or more embodiments as described herein.

An inventive article may comprise a combination of two or more embodiments as described herein.

Also is provided a process to form an inventive ethylene-based polymer, as described herein, said process comprising polymerizing ethylene in the presence of the at least one asymmetrical polyene of Structure A and/or Structure B. In a further embodiment, the polymerization takes place in a reactor configuration comprising at least one tubular reactor.

In one embodiment, the ethylene is polymerized in the presence of at least 50 mole ppm (based on amount of total monomers in reaction feed) of the asymmetrical polyene of Structure A and/or Structure B. In a further embodiment, the process takes place in a reactor configuration comprising at least one tubular reactor.

In one embodiment, the polymerization pressure is greater than, or equal to, 100 MPa. In a further embodiment, the polymerization takes place at least one pressure from 150 MPa to 350 MPa. In a further embodiment, the polymerization takes place at least one temperature from 100° C. to 380° C. In a further embodiment, the process takes place in a reactor configuration comprising at least one tubular reactor.

In one embodiment, the polymerization takes place in at least one tubular reactor or at least one autoclave. In one embodiment, the polymerization takes place in at least one autoclave. In one embodiment, the polymerization takes place in at least one tubular reactor.

In one embodiment, the asymmetrical diene is added to the polymerization in an amount from 0.002 to 0.300 mole percent, further from 0.005 to 0.300 mole percent, based on the total moles of ethylene and asymmetrical diene added to the polymerization. In a further embodiment, the polymerization takes place in two reactors. In another embodiment, the polymerization takes place in one reactor.

An inventive process may comprise a combination of two or more embodiments as described herein.

Process

For producing a highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

In one embodiment an initiator is injected prior to the reaction zone where free radical polymerization is to be induced.

Often a conventional chain transfer agent is used to control molecular weight. In a preferred embodiment, one or more conventional chain transfer agents (CTAs) are added to an inventive polymerization process. Typical CTA that can be used include, but are not limited to, propylene, isobutane, n-butane, 1-butene, methyl ethyl ketone, acetone, ethyl acetate, propionaldehyde, ISOPAR (ExxonMobil Chemical Co.), and isopropanol. In one embodiment, the amount of CTA used in the process is from 0.03 to 10 weight percent of the total reaction mixture.

In one embodiment, the process includes a process recycle loop to improve conversion efficiency.

In one embodiment, the polymerization may take place in a tubular reactor as described in international patent application PCT/US12/059469, filed Oct. 10, 2012. This patent application describes a multi zone reactor which describes alternate locations of feeding fresh ethylene to control the ethylene to CTA ratio and therefore control polymer properties. Fresh ethylene may be simultaneously added in multiple locations to achieve the desired ethylene to chain transfer ratio. In a similar way addition of fresh CTA addition points may be carefully selected to control polymer properties as described in international patent application PCT/US12/064284 (filed Nov. 9, 2012). Fresh CTA may be simultaneously added in multiple locations to achieve the desired CTA to ethylene ratio. Likewise, the addition points and the amount of the fresh branching agents, described in this application, may be controlled to control gels formation while maximizing the desired property of increased melt strength and performance in targeted applications. Fresh branching agent may be simultaneously added in multiple locations to achieve the desired branching agent to ethylene ratio. The use of a branching and or coupling agent to broaden molecular weight distribution and to increase the melt strength of the polymer will put further requirements on the distribution of the CTA and the branching agent along a reactor system in order to achieve the desired change in product properties without or minimizing potential negative impacts like gel formation, reactor fouling, process instabilities, low efficiency of branching agent, etc.

In one embodiment, the polymerization takes place in at least one tubular reactor. In the multi reactor system, the autoclave reactor usually precedes the tubular reactor. The addition points and amounts of fresh ethylene, fresh CTA, and fresh branching agent may be appropriately controlled to achieve the desired ratios of CTA to ethylene and branching agent to ethylene in the feeds to and or in the reaction zones.

In one embodiment, the asymmetrical diene is added to the polymerization in an amount from 0.002 to 0.300 mole percent, further from 0.005 to 0.300 mole percent, based on the total moles of ethylene and asymmetrical diene added to the polymerization. In a further embodiment, the polymerization takes place in two reactors. In another embodiment, the polymerization takes place in one reactor with multiple or at least two reaction zones.

Ethylene used for the production of ethylene-based polymer may be purified ethylene, which is obtained by removing polar components from a loop recycle stream, or by using a reaction system configuration, such that only fresh ethylene is used for making the inventive polymer. It is not typical that purified ethylene is required to make ethylene-based polymer. In such cases ethylene from the recycle loop may be used.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

In one embodiment, the ethylene-based polymer comprises ethylene and at least one asymmetrical polyene as the only monomeric units.

Initiators

Free radical initiators are generally used to produce the inventive ethylene-based polymers. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxy initiators are used in an amount from 0.001 to 0.2 weight percent, based upon the weight of polymerizable monomers.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGO- NOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers of this invention may be employed in a variety of conventional thermoplastic fabrication processes to produce useful articles, including monolayer and multi-layer films; molded articles, such as blow molded, injection molded, or rotomolded articles; coatings; fibers; and woven or non-woven fabrics.

An inventive polymer may be used in a variety of films, including but not limited to, clarity shrink films, collation shrink films, cast stretch films, silage films, stretch hood, sealants, and diaper backsheets.

Other suitable applications include, but are not limited to, wires and cables, gaskets and profiles, adhesives; footwear components, and auto interior parts.

A Summary of Some Embodiments a) As discussed above, an ethylene-based polymer is provided, which is formed from reacting at least the following: ethylene and at least one asymmetrical polyene, and wherein the reaction takes place in the presence of at least one free-radical initiator; and wherein the at least one asymmetrical polyene is selected from the following:

A)

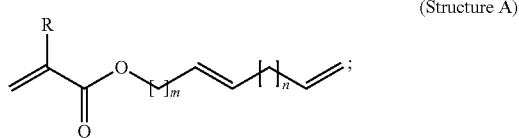

(Structure A)

wherein R=H or C1-C6 alkyl, m=1 to 12, n=1 to 10;

B)

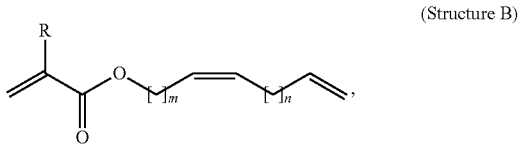

(Structure B)

wherein R=H or C1-C6 alkyl, m=1 to 12, n=1 to 10; or

C) a combination of Structure A and Structure B.

b) The ethylene-based polymer of a) above, wherein for Structure A, R=H or C1-C3 alkyl, and for Structure B, R=H or C1-C3 alkyl.

c) The ethylene-based polymer of a) or b) above, wherein for Structure A, R=C1-C3 alkyl, and for Structure B, R=C1-C3 alkyl.

d) The ethylene-based polymer of any one of a)-c) above, wherein for Structure A, m=1-3 and n=1-3, and for Structure B, m=1-3 and n=1-3.

e) The ethylene-based polymer of any one of a)-d) above, wherein for Structure A, m=1-2 and n=1-3, and for Structure B, m=1-2 and n=1-3.

f) The ethylene-based polymer of any one of a)-e) above, wherein for Structure A, m=1 and n=1-3, and for Structure B, m=1 and n=1-3.

g) The ethylene-based polymer of any one of a)-f) above, wherein for Structure A, m=1 and n=3, and for Structure B, m=1 and n=3.

h) The ethylene-based polymer of any one of a)-f) above, wherein for Structure A, m=1 and n=2, and for Structure B, m=1 and n=2.

i) The ethylene-based polymer of any one of a)-f) above, wherein for Structure A, m=1 and n=1, and for Structure B, m=1 and n=1.

j) The ethylene-based polymer of d) above, wherein for Structure A, m=1-3 and n=1-2, and for Structure B, m=1-3 and n=1-2.

k) The ethylene-based polymer of d) or j) above, wherein for Structure A, m=1-3 and n=1, and for Structure B, m=1-3 and n=1.

l) The ethylene-based polymer of any one of a)-k) above, wherein the at least one asymmetrical polyene is selected from Structure A.

m) The ethylene-based polymer of 1) above wherein the at least one asymmetrical polyene is selected from Structure A1:

(Structure A1)

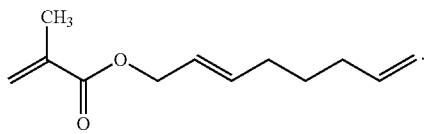

n) The ethylene-based polymer of any one of claims a)-k), wherein the at least one asymmetrical polyene is selected from Structure B.

o) The ethylene-based polymer of any of a)-n) above, wherein, in the reaction, the at least one asymmetrical polyene is present in an amount ≥100 ppm, or ≥150 ppm, or ≥200 ppm, or ≥250 ppm, based on the total amount of ethylene.

p) The ethylene-based polymer of any of a)-o) above, wherein, in the reaction, the at least one asymmetrical polyene is present in an amount less than, or equal to, 10,000 ppm, or ≤8,000 ppm, or ≤6,000 ppm, or ≤4,000 ppm, or ≤2,000 ppm, or ≤1,000 ppm, based on the total amount of ethylene.

q) The ethylene-based polymer of any of a)-p) above, wherein the ethylene-based polymer comprises, in polymerized form, ethylene and the polyene, as the only monomeric structures.

r) The ethylene-based polymer of any of a)-q) above, wherein the ethylene-based polymer is a LDPE modified with the polyene.

s) The ethylene-based polymer of r) above, wherein the ethylene-based polymer comprises, in polymerized form, ethylene and the polyene, as the only monomeric structures.

t) The ethylene-based polymer of any of a)-s) above, wherein the polymer comprises at least one structure selected from the group consisting of Structure I, Structure II, or both Structure I and Structure II, as shown below:

Structure I)

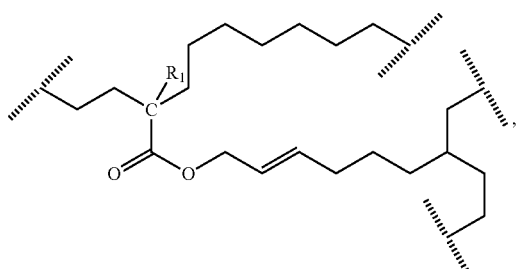

wherein R1 is selected from H or C1-C6 alkyl;

Structure II

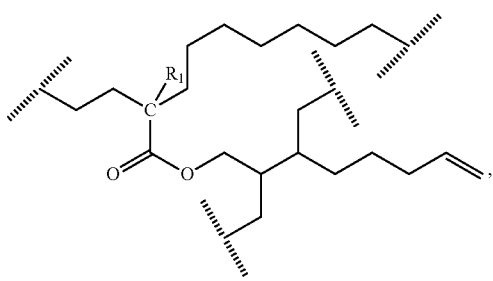

wherein R1 is selected from H or C1-C6 alkyl.

u) The ethylene-based polymer of t) above, wherein the polymer comprises at least one structure selected from Structure I, and further at least two structures selected from Structure I.

v) The ethylene-based polymer of t) above, wherein the polymer comprises at least one structure selected from Structure II, and further at least two structures selected from Structure II.

w) Also is provided a composition comprising the ethylene-based polymer of any of a)-v) above.

x) The composition of w) above, further comprising at least one other polymer.

y) Also provided is an article comprising at least one component formed from the composition of w) or x) above.

z) The article of y) above, wherein the article is a film or a coating.

aa) Also is provided a process to form the ethylene-based polymer of any one a)-v) above, said process comprising polymerizing ethylene in the presence of the at least one asymmetrical polyene.

bb) The process of aa) above, wherein the polymerization takes place in a reactor configuration comprising at least one tubular reactor.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises 50 wt % or a majority amount of polymerized ethylene, based on the weight of the polymer, and, optionally, may comprise at least one comonomer.

The term "ethylene-based interpolymer" refers to an interpolymer that comprises 50 wt % or a majority amount of polymerized ethylene, based on the weight of the interpolymer, and comprises at least one comonomer.

The term "ethylene-based copolymer" refers to a copolymer that comprises 50 wt % or a majority amount of polymerized ethylene, based on the weight of the interpolymer, and a comonomer, as the only monomer types.

The term "propylene-based polymer" refers to a polymer that comprises a majority amount of polymerized propylene, based on the weight of the polymer, and, optionally, may comprise at least one comonomer.

The term "reactor configuration," refers to one or more reactors, and optionally one or more reactor pre-heaters, used to polymerize a polymer. Such reactors include, but are not limited to, tubular reactor(s), autoclave reactor(s), and combinations of tubular and autoclave reactors.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability.

The term "consisting of" excludes any component, step, or procedure not specifically delineated or listed.

Test Methods

Density

Samples that were measured for density were prepared according to ASTM D 1928. Samples were pressed at 374° F. (190° C.), and 30,000 psi, for three minutes, and then at 70° F. (21° C.) and 30,000 psi for one minute. Density measurements were made within one hour of sample pressing, using ASTM D792, Method B.

Melt Index

Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Melt Strength

Melt strength was measured at 190° C. using a Goettfert Rheotens 71.97 (Goettfert Inc.; Rock Hill, S.C.). The melted sample (about 25 to 50 grams) was fed with a Goettfert Rheotester 2000 capillary rheometer, equipped with a flat entrance angle (180 degrees), and of length of 30 mm and diameter of 2 mm. The sample was fed into the barrel (L=300 mm, Diameter=12 mm), compressed, and allowed to melt for 10 minutes, before being extruded at a constant piston speed of 0.265 mm/s, which corresponds to a wall shear rate of 38.2 $s^{-1}$ at the given die diameter. The extrudate passed through the wheels of the Rheotens, located at 100 mm below the die exit, and was pulled by the wheels downward, at an acceleration rate of 2.4 $mm/s^2$. The force (in cN) exerted on the wheels was recorded as a function of the velocity of the wheels (in mm/s). Samples were repeated at least twice, until two curves of the force (in cN) as a function of strand velocity (in mm/s) superimpose, then the curve that had the highest velocity at the strand break was reported. Melt strength was reported as the plateau force (cN) before the strand broke.

Nuclear Magnetic Resonance ($^1$H NMR)

Each NMR sample was prepared by adding approximately "0.10 g of ethylene-based polymer" to "2.7 g of tetrachloroethane-d2 (TCE), containing 0.001 M Cr(AcAc)$_3$ (tfis(acetylacetonato)-chromium(III))" in a "NORELL 1001-7 10 mm NMR tube." The samples were purged by bubbling nitrogen through the solvent via a pipette, inserted into the tube for approximately five minutes, to prevent oxidation, and then they were capped, sealed with TEFLON tape, and then soaked at room temperature overnight to facilitate sample dissolution. The samples were kept in a nitrogen purge box during storage, before, and after, preparation to minimize exposure to oxygen. The samples were heated and mixed with a vortex mixer at 115° C. to ensure homogeneity. Each sample was visually inspected to ensure homogeneity.

The data were collected using a BRUKER AVANCE 400 MHz NMR Spectrometer, equipped with a BRUKER DUAL DUL high-temperature CRYOPROBE, at a sample temperature of 120° C. Each analysis was run with a ZG pulse, 32 scans, SWH 10,000 Hz, AQ 1.64 s, and D1 14 s. Acquisitions were repeated using a D1 of 28 s to check quantitation, and results were equivalent.

EXPERIMENTAL

Inventive Ethylene-Based Polymers A-1 and A-2 and Control A-0

Synthesis of Asymmetrical Diene 2,7-octadiene-1-ol methacrylate (ODMA).

The methacrylate monomer 2,7-octadiene-1-ol methacrylate was prepared in accordance with the method of example 1 in U.S. Pat. No. 4,916,255. In this case, 2,7-octadiene-1-ol raw material was obtained from Kuraray Co., LTD.

Asymmetrical Diene—

Undiluted 2,7-octadiene-1-ol methacrylate (ODMA) was loaded into a 316 stainless steel supply vessel, and diluted with ISOPAR E, to produce a final concentration of 1.8 wt %. This vessel was purged with nitrogen for three hours before use and kept under 70 psig nitrogen pad during operation.

Initiators—

Peroxide initiator tert-butyl peroxyacetate (TPA, 20% by weight solution in ISOPAR™ H) and peroxide initiator di-tert-butyl peroxide (DTBP, 20% by weight solution in ISOPAR™ H) were combined with ISOPAR™ E in a second 316 stainless steel supply vessel to produce 4000 mass ppm TPA and 6550 mass ppm DTBP, a ratio of 1:1 mole TPA/mole DTBP. The vessel was padded de-padded five times with 70 psig nitrogen before use and kept under nitrogen pad during operation.

Control (A-0)—

Ethylene was injected at 5440 gm/hr (194 moles/hr), at a pressure of 1831 bar, into an agitated (1600 rpm) 300 mL high pressure CSTR reactor, with an external heating jacket set at 220° C. Propylene (chain transfer agent) was added to the ethylene stream at a pressure of 62 bar and at a rate of 204 gm/hr (4.8 mole/hr), before the mixture was compressed to 1831 bar, and injected into the reactor. The peroxide initiator mixture was added directly to the reactor through the sidewall of the CSTR reactor, and at a pressure of 1831 bar, and at a rate of 0.11 gm/hr (0.83 millimoles/hr) of TPA and 0.18 gm/hr (0.83 millimoles/hr) of DTBP. The ethylene conversion to polymer was 11.2 wt %, based on the mass of ethylene entering the reactor, and the average reaction temperature was 220° C. An ethylene-based polymer with a melt index (I2) of 4.11 g/10 min was formed. Approximately 7.0 kg of this ethylene-based polymer (A-0) was collected.

Inventive Ethylene-Based Polymers A-1 and A-2

Propylene (CTA) was added to the ethylene stream at a pressure of 62 bar, and at a rate of 194 gm/hr (4.6 mole/hr), before the mixture was compressed to 1819 bar, and injected into the reactor (see above). The solution of ODMA in ISOPAR E was pumped at a pressure of 1819 bar, and at a rate of 42 gm/hr (3.9 millimoles/hr) into the ethylene-propylene mixture, before said mixture was injected into the reactor. The peroxide initiator was added directly to the reactor, through the sidewall, at a pressure of 1819 bar, and at a rate of 0.12 gm/hr (0.91 millimoles/hr) of TPA and 0.20 gm/hr (0.92 millimoles/hr) of DTBP. The ethylene conversion to polymer was 12.5 wt %, based on the mass of ethylene entering the reactor, and the average reaction temperature was 219° C. An ethylene-based polymer with a melt index (I2) of 4.11 g/10 min was formed. Approximately 6.9 kg of this ethylene-based polymer (A-1) was collected. The ODMA amount was increased once to form one more inventive polymer (A-2). Reaction polymerization conditions are summarized below in Table 1. Properties of the polymers are shown in Table 2 below.

TABLE 1

Polymerization Conditions

|  | Ethylene (gm/hr) | Propylene (gm/hr) | t-butyl peroxy-acetate (gm/hr) | di-t-butyl peroxide (gm/hr) | 1.8 wt. % ODMA in ISOPAR E (gm/hr) | Reaction Temp. (° C.) | Ethylene Conversion (wt. %) | Ethylene-Based Polymer Collected (kg) |
|---|---|---|---|---|---|---|---|---|
| A-0 | 5440 | 204 | 0.11 | 0.18 | 0 | 220° C. | 11.2 | 7.0 |
| A-1 | 5440 | 194 | 0.12 | 0.20 | 42 | 219° C. | 12.5 | 6.9 |
| A-2 | 5440 | 179 | 0.12 | 0.20 | 125 | 220° C. | 12.0 | 3.9 |

TABLE 2

Polymer Properties

|  | Moles ODMA per 1000 C by $^1$H NMR | Melt Index (I2) (g/10 min) | Melt Strength (cN) |
|---|---|---|---|
| A-0 | 0.0 | 4.11 | 7.3 |
| A-1 | 0.065 | 4.11 | 8.5 |
| A-2 | 0.192 | 4.13 | 9.1 |

The $^1$H NMR spectrum of an inventive ethylene-based polymer (see FIG. 1) was obtained according to the procedure in the above "Test Methods" section. The integration of all protons in the spectrum was determined, and set equal to 20,000 protons, corresponding to 10,000 carbons. The peaks corresponding to H protons (4.25 to 4.45 ppm chemical shift) in the FIG. 1 were integrated, representing the moles of H protons per 20,000 protons overall. Since there are 2H protons per 2,7-octadiene-1-ol methacrylate molecule, this number was divided by two, to get the number of moles of 2,7-octadiene-1-ol methacrylate per 10,000 carbons. Another calculation was done by integrating the F or G protons (5.3 to 5.5 ppm chemical shift). This integration gave the number of moles of 2,7-octadiene-1-ol methacrylate per 10,000 carbons. Typically this measurement differed slightly from the value calculated from the H protons. The two numbers were averaged, and the result reported as the number of moles of 2,7-octadiene-1-ol methacrylate per 10,000 carbons. This number was divided by 10, and reported as the number of moles of 2,7-octadiene-1-ol methacrylate per 1000 carbons.

MO (Molecular Orbital) Calculations

Below are the MO calculations on 7-octene-1-ol methacrylate (OMA) and 2,7-octadiene-1-ol methacrylate (ODMA). These monomers react by two mechanisms in the LDPE process. The first mechanism is addition polymerization of ethylene monomers to carbon-carbon double bonds in the monomers below. For OMA, addition polymerization can occur through the methacrylate moiety on the left side of the molecule and through the terminal C=C on the right side of the molecule. This mechanism is termed "propagation" in the quantum mechanical calculations in Table 3. The methacrylate carbon is C1 and the terminal C=C carbon is C12. The numbers given in Table 3 for these carbons is the rate of reaction of ethylene with these carbons relative to the rate of reaction with another ethylene monomer. That means that reaction at the methacrylate carbon (C1) is 21.62 times faster than reaction with another ethylene molecule, so this moiety of the molecule is consumed quickly. The terminal C=C carbon reacts much slower at only 0.391 times the rate of adding another ethylene monomer. Although this is a slow reaction rate, it will still react with ethylene making branched LDPE.

MO calculations on ODMA show this diene to be surprisingly advantaged over OMA in at least four ways. First, the propagation rate of ODMA at C1 is 33.23 which is substantially faster than the propagation rate of OMA at C1 (21.62). Second, the propagation rate at C12 is also faster for ODMA versus OMA (0.530 vs. 0.390). This means that per molecule of monomer, more branching will occur with ODMA versus OMA. Third, ODMA has small but significant propagation rates at C6 and C7 (0.116 and 0.089 respectively) whereas OMA has zero propagation at these carbons, meaning that ODMA will branch occasionally at these carbons creating higher overall branching. Fourth, branching can also occur by a chain transfer mechanism, which involves abstraction of a hydrogen from the hydrocarbon chain of the monomer forming a backbone radical, with initiates a new branch by reaction with ethylene monomer. The calculated "Total Cs value" in each table represents the relative reaction rates of hydrogen abstraction followed by polyethylene chain growth. The total Cs value for ODMA is 0.486 versus 0.285 for OMA, meaning that ODMA will have higher branching by chain transfer than OMA. Overall, ODMA surprisingly better than OMA in at least four ways.

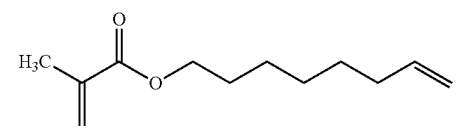

7-octene-1-ol methacrylate

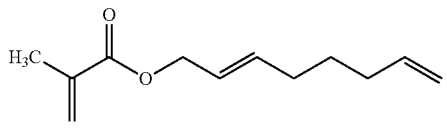

2,7-octadiene-1-ol methacrylate

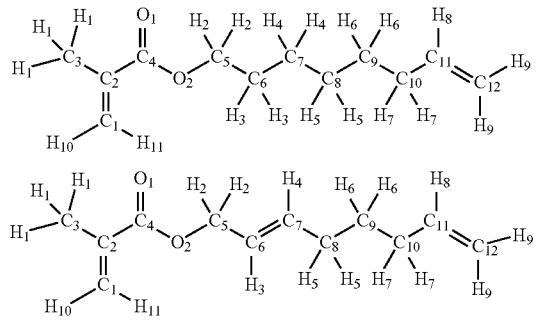

In the above atomically labeled structures, the carbon, oxygen and hydrogen atoms are labelled for easy reference in the text and tables below. Equivalent hydrogens are labeled with the same subscript. Table 3 lists the QM (Quantum Mechanics) results for hydrogen abstraction and propagation for the saturated "7-octene-1-ol methacrylate" molecule. The kET is the calculated rate coefficient for ethylene propagation. Table 4 lists the QM results for hydrogen abstraction and propagation for the "2,7-octadiene-1-ol methacrylate." The "kET" is the calculated rate coefficient for ethylene propagation.

TABLE 3

7-octene-1-ol Methacrylate

| Atom # | Log10 (A) | Ea (kcal mol-1) | k573K (L mol-1 s-1) | k573K/kET (573K) |
|---|---|---|---|---|
| Abstraction H1 | 8.88 | 12.9 | 9.11E+03 | 0.098 |
| Abstraction H2 | 8.28 | 13.7 | 1.18E+03 | 0.013 |
| Abstraction H3 | 8.38 | 14.4 | 7.85E+02 | 0.008 |
| Abstraction H4 | 8.29 | 14.2 | 7.91E+02 | 0.008 |
| Abstraction H5 | 8.06 | 14.2 | 4.48E+02 | 0.005 |
| Abstraction H6 | 8.33 | 14.3 | 7.47E+02 | 0.008 |
| Abstraction H7 | 8.50 | 11.5 | 1.35E+04 | 0.145 |
| Total Cs value | | | | 0.285 |
| Propagation C1 | 8.16 | 4.89 | 2.01E+06 | 21.62 |
| Propagation C12 | 7.94 | 8.89 | 3.63E+04 | 0.390 |

TABLE 4

2,7-octadiene-1-ol Methacrylate

| Atom # | Log10 (A) | Ea (kcal mol-1) | k573K (L mol-1 s-1) | k573K/kET (573K) |
|---|---|---|---|---|
| Abstraction H1 | 9.02 | 13.0 | 1.24E+04 | 0.133 |
| Abstraction H2 | 8.28 | 11.3 | 9.74E+03 | 0.105 |
| Abstraction H5 | 8.47 | 11.4 | 1.30E+04 | 0.140 |

TABLE 4-continued 2,7-octadiene-1-ol Methacrylate

| Atom # | Log10 (A) | Ea (kcal mol-1) | k573K (L mol-1 s-1) | k573K/kET (573K) |
|---|---|---|---|---|
| Abstraction H6 | 8.39 | 14.2 | 1.01E+03 | 0.011 |
| Abstraction H7 | 8.33 | 11.5 | 9.08E+03 | 0.098 |
| Total Cs value | | | | 0.486 |
| Propagation C1 | 8.33 | 4.84 | 3.09E+06 | 33.23 |
| Propagation C6 | 7.61 | 9.41 | 1.08E+04 | 0.116 |
| Propagation C7 | 7.54 | 9.52 | 8.26E+03 | 0.089 |
| Propagation C12 | 8.06 | 8.85 | 4.93E+04 | 0.530 |

Computational Methodology

All quantum mechanical (QM) calculations were performed using the density functional theory (DFT) formalism as implemented in the Gaussian09 commercial software package.[1] The geometries were optimized in the gas phase using Becke's three parameter hybrid exchange functional (B3),[2] the correlation functional of Lee, Yang and Parr (LYP),[3] and the 6-31+G(d,p) basis set.[4-6] The geometry with the lowest electronic energy of all species and transition states (TSs) was found by a combination of conventional optimization and one-dimensional potential energy dihedral scans. In the case of the TSs, the bond length corresponding to the formation of the TS was kept frozen during all dihedral scans. All TSs were verified by the presence of a single imaginary frequency and its visualization to ensure that the TS led to the desired products and reactants. In addition, when visualization of the imaginary vibrational mode was insufficient to validate the TSs, the intrinsic reaction coordinate (IRC) was followed in both directions.[7] The temperature correction to the free energy was calculated using the frequencies from the full optimization at the B3LYP/6-31+G(d,p) level of theory with the harmonic oscillator (HO) approximation by means of standard formulae from statistical thermodynamics.[8] Furthermore, the translational contribution to the calculated entropy was corrected to account for the experimental pressure. In order to improve the calculated electronic energy contribution, single-point (SP) energy calculations were performed at the following level:

M06-2X/6-311+G(3df,2p)//B3LYP/6-31+G(d,p) level of theory, where M06-2X is the hybrid meta-generalized gradient approximation (hybrid-metaGGA) within DFT, developed by Truhlar and co-workers.[9] In addition, to reduce the basis set superposition error (BSSE), counterpoise[10,11] correction (CP) calculations were adopted. The calculated Gibbs free energies were used in Equation 1 to estimate the rate parameters associated with hydrogen abstraction and propagation.[12]

$$k(T) = \sigma\kappa(T)\left(\frac{k_B T}{h}\right)C_0^{1-n}\exp\left(\frac{-\Delta G^{\ddagger}}{RT}\right).$$ (Equation 1)

In Equation 1, α is the reaction path degeneracy, κ(T) is the tunneling coefficient, T is the absolute temperature of interest, n is the molecularity of the reaction, $C_0$ is the standard state concentration, $\Delta G^{\ddagger}$ is the Gibbs free energy of activation, and $k_B$, h, and R are the Boltzmann, Plank's and the universal gas constants, respectively. Equation 1 was also used to derive the pre-exponential factor and activation energy associated with the reaction steps after the rate coefficient was estimated at different temperature, and a plot of "ln(k) versus 1/T" was constructed. In order to obtain the long-chain rate parameters, the radical species in our calculations was comprised on three ethylene units. Whenever necessary, different isomers of the CTA molecules were considered.

REFERENCES

[1] Gaussian 09, Revision D.01, Frisch, M. J.; Trucks, G. W.; Schlegel, H. B.; Scuseria, G. E.; Robb, M. A.; Cheeseman, J. R.; Scalmani, G.; Barone, V.; Mennucci, B.; Petersson, G. A.; Nakatsuji, H.; Caricato, M.; Li, X.; Hratchian, H. P.; Izmaylov, A. F.; Bloino, J.; Zheng, G.; Sonnenberg, J. L.; Hada, M.; Ehara, M.; Toyota, K.; Fukuda, R.; Hasegawa, J.; Ishida, M.; Nakajima, T.; Honda, Y.; Kitao, O.; Nakai, H.; Vreven, T.; Montgomery, Jr., J. A.; Peralta, J. E.; Ogliaro, F.; Bearpark, M.; Heyd, J. J.; Brothers, E.; Kudin, K. N.; Staroverov, V. N.; Kobayashi, R.; Normand, J.; Raghavachari, K.; Rendell, A.; Burant, J. C.; Iyengar, S. S.; Tomasi, J.; Cossi, M.; Rega, N.; Millam, J. M.; Klene, M.; Knox, J. E.; Cross, J. B.; Bakken, V.; Adamo, C.; Jaramillo, J.; Gomperts, R.; Stratmann, R. E.; Yazyev, O.; Austin, A. J.; Cammi, R.; Pomelli, C.; Ochterski, J. W.; Martin, R. L.; Morokuma, K.; Zakrzewski, V. G.; Voth, G. A.; Salvador, P.; Dannenberg, J. J.; Dapprich, S.; Daniels, A. D.; Farkas, O.; Foresman, J. B.; Ortiz, J. V.; Cioslowski, J.; Fox, D. J. Gaussian, Inc., Wallingford Conn., 2009.
[2] Becke, A. D. J Chem Phys 1993, 98, 5648.
[3] Lee, C. T.; Yang, W. T.; Parr, R. G. Phys Rev B 1988, 37, 785.
[4] Frisch, M. J.; Pople, J. A.; Binkley, J. S. J Chem Phys 1984, 80, 3265.
[5] Harihara. Pc; Pople, J. A. Theor Chim Acta 1973, 28, 213.
[6] Hehre, W. J.; Ditchfie. R; Pople, J. A. J Chem Phys 1972, 56, 2257.
[7] Gonzalez, C.; Schlegel, H. B. J Phys Chem-Us 1990, 94, 5523.
[8] McQuarrie, D. Statistical Mechanics; University Science Books: Sausalito, C A, 2000.
[9] Zhao, Y.; Truhlar, D. G. Theor Chem Acc 2008, 120, 215.
[10] Boys, S. F. and Bernardi, F. Mol. Phys. 1970, 19, 553.
[11] Simon, S.; Duran, M.; Dannenberg, J. J. J. Chem. Phys. 1996, 105, 11024.
[12] Cramer, C. J. Essentials of Computational Chemistry: Theories and Models; John Wiley & Sons, 2004.

The invention claimed is:

1. An ethylene-based polymer formed from reacting at least the following:
ethylene and at least one asymmetrical polyene, and wherein the reaction takes place in the presence of at least one free-radical initiator; and wherein the at least one asymmetrical polyene is selected from the following:

A)

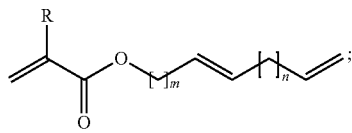

(Structure A)

wherein R=H or C1-C6 alkyl, m=1 to 12, n=1 to 10;

B)

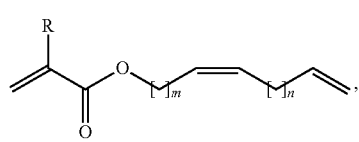

(Structure B)

wherein R=H or C1-C6 alkyl, m=1 to 12, n=1 to 10; or
C) a combination of Structure A and Structure B.

2. The ethylene-based polymer of claim 1, wherein for Structure A, R=H or C1-C3 alkyl, and for Structure B, R=H or C1-C3 alkyl.

3. The ethylene-based polymer of claim 1, wherein for Structure A, R=C1-C3 alkyl, and for Structure B, R=C1-C3 alkyl.

4. The ethylene-based polymer of claim 1, wherein for Structure A, m=1-3 and n=1-3, and for Structure B, m=1-3 and n=1-3.

5. The ethylene-based polymer of claim 1, wherein the ethylene-based polymer comprises, in polymerized form, ethylene and the polyene, as the only monomeric structures.

6. The ethylene-based polymer of claim 1, wherein the polymer comprises at least one structure selected from the group consisting of Structure I, Structure II, or both Structure I and Structure II, as shown below:

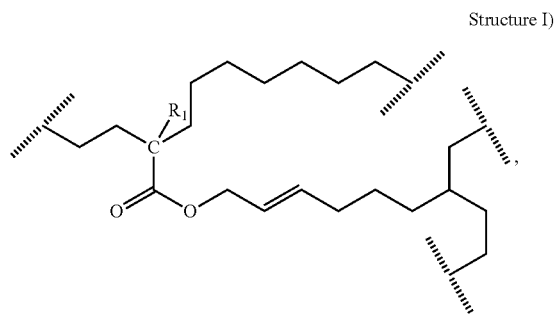

Structure I)

wherein R1 is selected from H or C1-C6 alkyl;

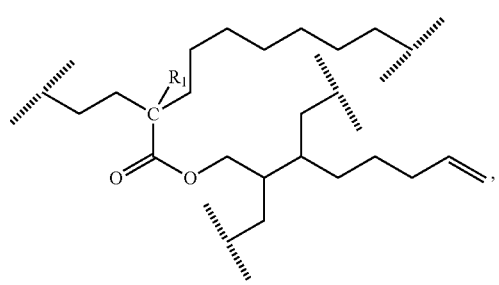

Structure II, wherein R1 is selected from H or C1-C6 alkyl.

7. A composition comprising the ethylene-based polymer of claim 1.

8. The composition of claim 7, further comprising at least one other polymer.

9. An article comprising at least one component formed from the composition of claim 7.

10. A process to form the ethylene-based polymer of claim 1, said process comprising polymerizing ethylene in the presence of the at least one asymmetrical polyene.

11. An article comprising at least one component formed from the composition of claim 8.

\* \* \* \* \*